UNITED STATES PATENT OFFICE.

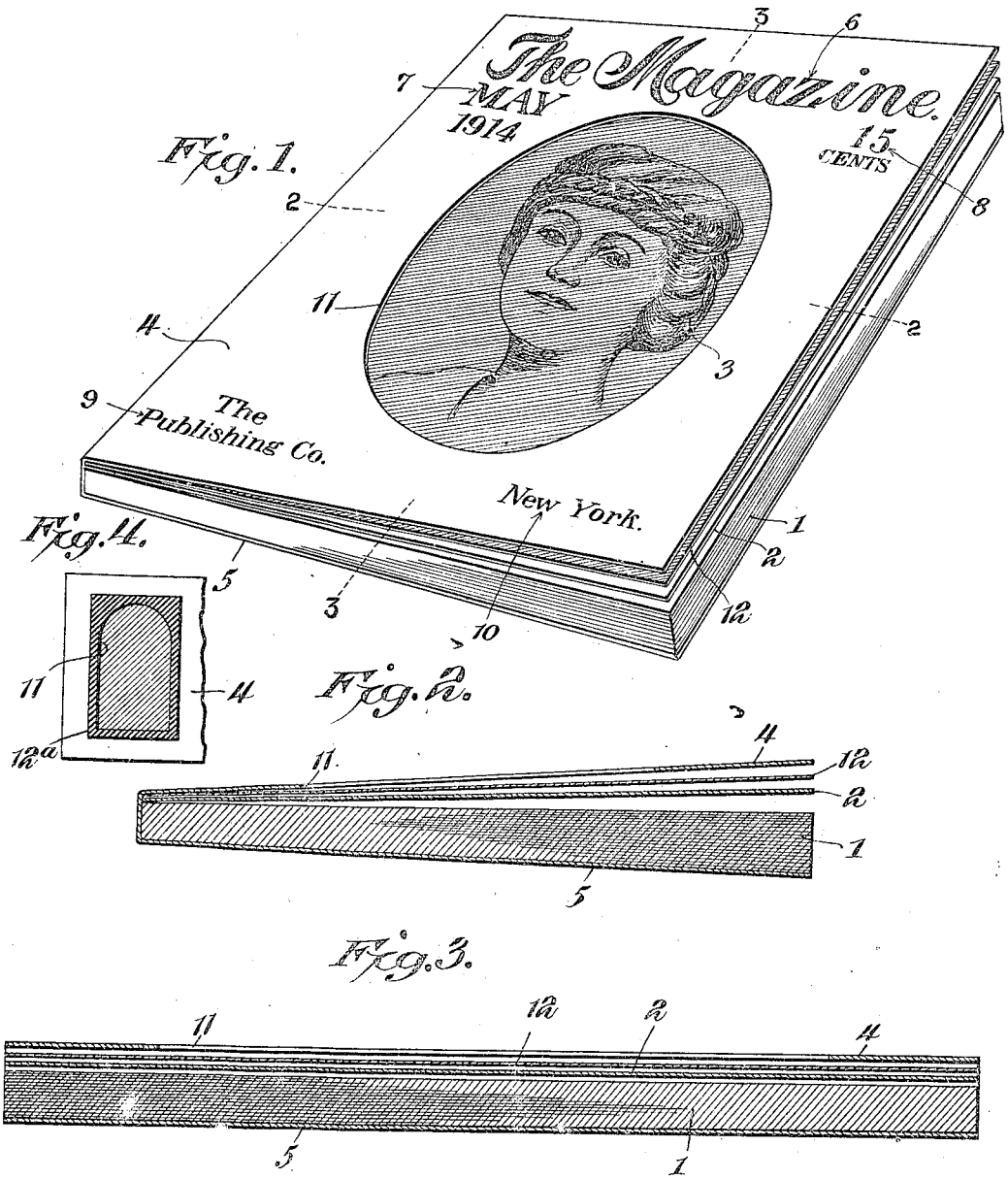

HENRY WILLIAM JACOB GRUETTNER, OF VALLEJO, CALIFORNIA.

COVER FOR MAGAZINES.

1,168,392.  Specification of Letters Patent.  Patented Jan. 18, 1916.

Application filed June 11, 1914. Serial No. 844,557.

*To all whom it may concern:*

Be it known that I, HENRY W. J. GRUETTNER, a citizen of the United States, residing at Vallejo, in the county of Solano and State of California, have invented certain new and useful Improvements in Covers for Magazines, of which the following is a specification.

This invention has reference to improvements in covers for magazines, and its object is to provide a magazine cover of art design whereby the picture usually incorporated in the cover may be supplied without advertising matter, but at the same time produce the desired artistic effect in conjunction with the advertising matter that is provided on magazine covers as usually produced.

It is customary to print the name of the magazine with the publisher's name and other information in such manner upon the cover as to prevent the utilization of the picturesque portion of the cover for art purposes separate from the advertising matter, and it is also customary to provide subscribers with the picture portion of the cover free from advertising matter at an advanced rate.

With the present invention the unlettered picture may be provided as a component part of the magazine cover without extra cost, and so associated with the advertising matter that the object of the publisher is fully accomplished with added value given to the purchaser without material added expense to the purchaser.

With the present invention the cover of the magazine is produced as usual but without the picture portion imprinted thereon, the cover being provided with a cut-out, and the picture free from advertising matter is secured in the magazine between the body of the latter and the cover, so that the picture portion is visible through the cut out. In order to preserve the picture portion against soiling or other injury, a protecting sheet is introduced between the cover proper and the picture, which sheet may be of sufficiently transparent material to give a fairly clear view of the picture through the cut-out, whereby the artistic effect of a picturesque cover design is obtained without any advertising matter being present upon the picture itself or the sheet upon which the picture is printed.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is a perspective view of a magazine constructed in accordance with the present invention. Fig. 2 is a section on the line 2—2 of Fig. 1. Fig. 3 is a section on the line 3—3 of Fig. 1. Fig. 4 is a rear view of a fragment of the cover sheet showing a small transparent protecting sheet fast thereto.

Referring to the drawings, there is shown a magazine 1 which may be taken as indicative of any magazine provided with an artistic cover, which latter usually has some design thereupon produced by some artist, and sometimes an artist of note, but it is customary to imprint the title of the magazine, the name of the publisher, and other matter upon the face of the cover, thus in a large measure spoiling the effectiveness of the cover for preservation, although some covers are so highly artistic and so well executed as to warrant preservation. With some magazines the cover designs are real works of art, and it is the desire of many purchasers to preserve such designs, but in many instances portions of the designs must be sacrificed in order to cut away the advertising matter.

In accordance with the present invention there is bound into the front portion of the magazine a sheet 2 upon which the artistic portion of the cover, including that portion which it is desirable to preserve, is printed, and this portion is indicated in Fig. 1 at 3.

The usual cover is customarily in the form of a sheet of paper including the front portion 4, and the magazine back 5 having a junction portion extending around the edge of the magazine remote from that to be opened. The front portion usually contains the magazine title indicated at 6, other advertising matter such as a date imprint 7, and a price imprint 8, and also the name of the publishing concern as indicated at 9, and the place of publication, as indicated at 10, and oftentimes other advertising matter is included, while in some magazines some of the matter shown in Fig. 1 is omitted.

The front cover 4 is provided with a cut-out 11 of any appropriate size, but large enough to expose to view the greater portion of the design 3.

In order to protect the design from liability of injury by soiling or otherwise, there is bound into the magazine a sheet 12 between the sheet 2 and the cover 4, so as to overlie the design 3 where exposed to view through the cut-out 11. This sheet 12 may be made of isinglass, transparent paper, such as onion skin, or the like, any of which is so nearly transparent that the design is quite visible through it, although, of course, not so clearly visible as when the sheet 12 is omitted. Such transparent sheet, however, is protective of the design, so that the purchaser may be assured of obtaining the unlettered design sheet with little chance of injury thereto. At the same time the general artistic effect of a cover as usually produced with the design and imprinting all on the same sheet is retained, so that the object of the artistic cover is accomplished, so far as the publisher is concerned, and the value of the magazine is enhanced by the presence of the unlettered design, costing the publisher so little extra to produce as to enable the magazine to be sold at the same price as before, while the advantage to the purchaser is so much greater that the presence of the unlettered design sheet will contribute very materially to increase the circulation of the magazine, and thus repay the publisher for the slightly added expense due to the incorporation of the present invention.

As to the protecting sheet 12, it is immaterial as to how it may be incorporated in the publication, since it may be loosely placed between the external sheet 4 and the ornamented sheet 2, or it may be bound in the magazine in the usual manner, or it may be made a permanent part of the external sheet, in which latter case it need be but little larger than the cut-out, such small protecting sheet being shown at 12ᵃ in Fig. 4, being made fast at the margins to the sheet 4 about the cut-out 11. The sheet 2 which constitutes the ornamental element of the cover may be bound in the magazine in the usual manner, or may be otherwise secured thereto, to prevent its accidental displacement.

What is claimed is:—

In a magazine, a cover comprising an external sheet having a cut-out and also having printed matter on its visible surface about the cut-out for imparting information as to the magazine, and another sheet bound into the magazine back of the first sheet and separate from the latter, said second sheet being free from printing of the kind customarily placed on magazine covers and provided with artistic ornamentation located thereon in position to be visible through the cut-out of the first-named sheet and coacting with the advertising matter on the external sheet to produce an ornamental cover for the magazine.

In testimony whereof I affix my signature in presence of two witnesses.

HENRY WILLIAM JACOB GRUETTNER.

Witnesses:
J. A. FITZGERALD,
R. GRUETTNER.